United States Patent [19]
Garcia

[11] 3,729,851
[45] May 1, 1973

[54] LIVE SHRIMP SECURING FISHING LURE

[76] Inventor: Gilbert C. Garcia, 163 Tabard Drive, San Antonio, Tex. 78213

[22] Filed: Aug. 25, 1971

[21] Appl. No.: 174,819

[52] U.S. Cl. ................................................ 43/44.8
[51] Int. Cl. ............................................. A01k 83/06
[58] Field of Search ..................... 43/44.8, 44.2, 44.4

[56] References Cited

UNITED STATES PATENTS

| | | | |
|---|---|---|---|
| 2,598,011 | 5/1952 | Pitre | 43/44.8 |
| 2,559,409 | 7/1951 | Dohmeyer | 43/44.8 |
| 3,047,977 | 8/1962 | Der-Hagopian | 43/44.8 |
| 533,652 | 2/1895 | Kittle | 43/44.4 |
| 911,040 | 2/1909 | Hickey | 43/44.8 |
| 2,454,879 | 11/1948 | Mattingly | 43/44.8 |
| 2,727,330 | 12/1955 | Huff | 43/44.4 |

Primary Examiner—Louis G. Mancene
Assistant Examiner—Daniel J. Leach
Attorney—Willard J. Hodges, Jr.

[57] ABSTRACT

A combined fish hook live shrimp holding device primarily designed as a salt water fishing lure. The device employs a long shank double or treble hook to which is secured adjacent the bight of the hook a shell grasping member. The device is further attached to the shrimp by means of a shrimp horn ring that is secured in position by either spring loading or friction or a combination of both.

9 Claims, 12 Drawing Figures

Patented May 1, 1973

INVENTOR
GILBERT C. GARCIA
BY
ATTORNEY

INVENTOR
GILBERT C. GARCIA
BY
ATTORNEY

LIVE SHRIMP SECURING FISHING LURE

BACKGROUND OF THE INVENTION

1. Field of Invention

This invention pertains to a new concept of a live shrimp hook fishing lure primarily intended as a salt water lure capable of use for casting, still fishing or "free shrimping" when the live shrimp is free to swim in the water.

2. Description of Prior Art

A common method of securing the shrimp to the hook is to pierce the tail of the shrimp with a hook. The disadvantage of such a procedure is that the shrimp is short lived and frequently works free of the hook. Some special lure devices have been designed some of which have been patented which encircle the body of the shrimp or minnow. Others encircle the body under tension or pierce the body of the shrimp. Others employ spring action to clamp the body of the shrimp or minnow.

SUMMARY OF THE INVENTION

An object of this invention is to provide a device which will securely hold the live shrimp with minimum injury thereby encouraging the shrimp to remain alive.

The devices of this invention each employ a broad thin shell grasping member which is securely fixed to the shank of preferably a double or treble hook adjacent the shank and the point of the start of the arcuate bight of the hook. The shell grasping member is inserted around and under the body shell of the live shrimp. The shrimp is fully secured to the lure device by means of a horn ring which slides over and around the horn of the shrimp. The horn ring is retained in position by either friction or spring loading in the various species or modifications of the invention.

As illustrations of the construction of the preferred embodiment, reference is made to the attached several views wherein like reference characters will be used to refer to identical or equivalent components throughout the various FIGS. and the detailed description.

DETAILED DESCRIPTION OF THE PREFERRED EMBODIMENT

Figure 1:
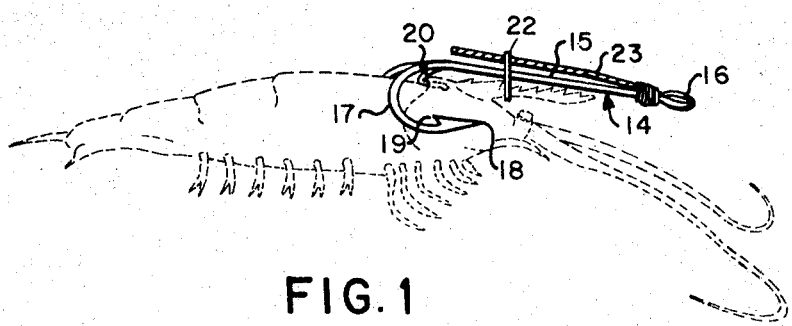
FIG. 1 is a side perspective view of an embodiment of the device attached to a shrimp.
Figure 2:
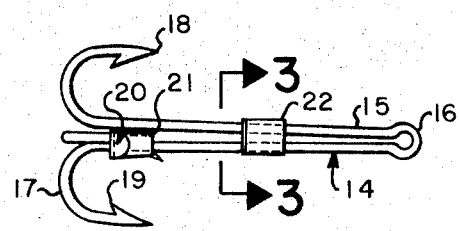
FIG. 2 is a species of the device employing one of the hooks for spring loading of the horn ring.
Figure 3:
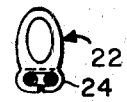
FIG. 3 is a sectional view of the device taken on line 3—3 of FIG. 2 looking in the direction of the arrows.
Figure 5:
FIG. 5 is a sectional view of the device taken on line 5—5 of FIG. 4 looking in the direction of the arrows.
Figure 4:
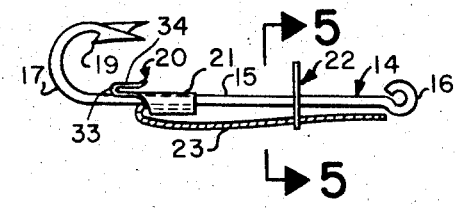
FIG. 4 illustrates a modified species of the device employing a serrated spring for securing the horn ring into position.
Figure 6:
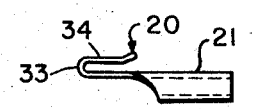
FIG. 6 illustrates the shell grasping member of the species of the device illustrated in FIGS. 1, 2, 4 and 9.
Figure 7:
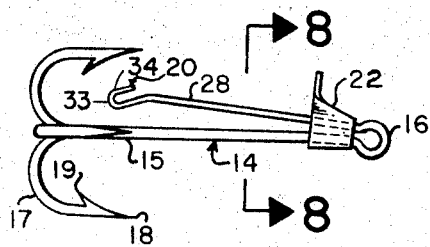
FIG. 7 illustrates a species of the device employing an elongated spring shell grasping member.
Figure 8:
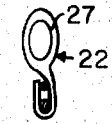
FIG. 8 is a sectional view of the device taken substantially on line 8—8 of FIG. 7 looking in the direction of the arrows.
Figure 9:
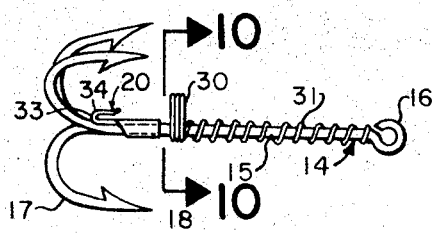
FIG. 9 illustrates a species of the device employing a coiled spring horn ring.
Figure 10:
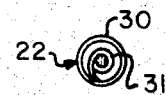
FIG. 10 is a sectional view of the device taken substantially on line 10—10 of FIG. 9 looking in the direction of the arrows.
Figure 11:
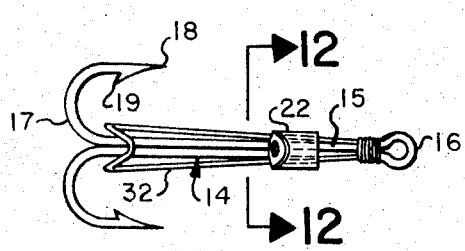
FIG. 11 is an illustration of an elongated shell grasping member constructed of spring wire which also serves to secure the horn ring in position.
Figure 12:
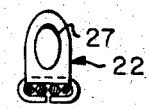
FIG. 12 is a sectional view taken on line 12—12 of FIG. 11 looking in the direction of the arrows.

For a detailed description of the construction and utilization of the devices of this invention, reference is made to the various FIGS. The device is preferably constructed employing a double or treble fish hook 14. These hooks 14 are of conventional construction employing an elongated shank 15, an eye 16 to which a line may be secured, and a conventional bight 17 which extends to a point 18 with a barb 19 adjacent the point. Each species of the device employs a shell grasping member 20 which is preferably constructed of hook like sheet metal including a base 21 which may be soldered to or clamped around shank 15 of the hook 14 adjacent the bight 17. Details of the configuration of this component is perhaps best illustrated in FIG. 6. This component comprises a base portion 21, an arcuate portion 33 projecting outward from said base portion 21 and terminating in a shell grasping portion 34 which projects parallel to and spaced from said base portion 21. The shell grasping member is constructed in a configuration so as to be inserted under or clipped onto the body shell of the shrimp as illustrated in FIG. 1. The device is further secured to the shrimp by means of the horn ring 22 which encircles the shank 15 of the hook 14. This horn ring is laterally movable along the length of the shank 15. The horn rings 22 are of various configurations and employ varied means for retaining the horn ring 22 in a relatively fixed position on the shank 15 to secure the device to the shrimp after attaching the shell grasping member 20. The horn ring 22 is inserted over the horn of the shrimp and secured into position. One method of securing the device into position is by means of horn ring spring 23 illustrated in FIG. 1 and 4. This species of the device employs a horn ring spring 23 which has a rough or serrated surface. This spring 23 is secured to the shank of the hook and projects at an angle diverging from the shank 15. The device may be secured adjacent the eye 16 or adjacent the bight 17 as illustrated in FIG. 4. The manner in which this species of the device latches the horn ring 22 in position is by means of a spring aperture 26 through which spring 23 projects. The tension of the spring 23 on horn ring 22 as illustrated in FIG. 1 holds the horn ring 22 in position around the shrimp horn. For the details of the construction of horn ring 22, reference is particularly made to FIG. 5. The device may be constructed of thin sheet metal and is mounted on shank 15. Spring aperture 26 as well as a horn aperture 27 is constructed in this type horn ring 22. Another species of horn ring spring 23 is illustrated in FIG. 2. In this embodiment of the device, one of the shanks 15 of a double hook 14 serves as a horn ring spring 23. In this species of the device, the horn ring 22 is constructed on the horn ring base 24 which encircles the shank 15 of the hook 14 and slides therealong. The devices as illustrated in FIGS. 2, 7, and 11 are generally referred to as a frictionally secured horn ring 22. In this connection, reference is particularly made to FIG. 7. The device of this species of the invention is constructed with a spring shell grasping member 28 which is an elongated member projecting substantially parallel to shank 15 of fish hook 14. This spring shell grasping member 28 is constructed with a hook like shell grasping member 20 at the end thereof adjacent the bight 17 of the fish hook 14. Spring shell grasping member 28 serves a dual function of grasping the body shell of the shrimp as well as spring loading and frictionally securing horn ring 22 relative to the shank 15 of the hook 14. Another method of construction of the device is illustrated in FIG. 9. This species of the device is generally referred to as a coil spring horn ring 30 which includes a coil spring 31 wound about the shank 15 of the fish hook 14. This device is, of course, constructed with a shell grasping member 20 as previously described which in combination with the coil spring horn ring 30, which is spring loaded by coil spring 31, secures the device to the shrimp. The construction of the fifth species of this device is illustrated in FIGS. 11 and 12. In this embodiment or concept of the device, the shell grasping member 20 is more aptly described as a spring wire shell grasping member 32. The configuration and contour of this device is substantially the configuration illustrated in FIG. 6. However, the device is formed from an arcuate hooked section of spring wire characterized as a spring wire shell grasping member 32 which is secured to the shank 15 of hook 14. This spring wire shell grasping member 32 is used in conjunction with a frictionally secured horn ring 22 mounted around and slidably secured to shank 15 of hook 14. Spring wire shell grasping member 32 assists in tensioning and holding in position the horn ring 22 substantially in the manner as previously described.

In each of the species of the device, the construction of which has been described in detail, the hook 14 is secured to a fishing line in the conventional manner. The shell grasping member 20, spring shell grasping member 28 or spring wire shell grasping member 32 is forced under the tail section of the body shell of the shrimp as illustrated in FIG. 1. Horn ring 22 is slipped over the horn of the shrimp and secured into position by one of the various means previously illustrated. The shell grasping member in conjunction with the horn ring 22 securely grasps and retains the shrimp without substantial injury. The combined device and live shrimp may be fished in any of the various conventional well known methods. In tests use, it has been ascertained that shrimp may be secured for extended periods of time with little injury to the shrimp. He remains live and active in the water and in "free shrimping" he swims freely to attract fish.

Having disclosed and described in detail five species of my invention what is desired to be claimed is all modifications and embodiments not departing from the scope of equivalents of the appended claims.

I claim:

1. A live shrimp securing fishing lure comprising:
  a. a fish hook including,
  b. an elongated shank having,
  c. a line securing means at the first end of said shank,
  d. a bight end at the second end of said shank,
  e. a shell grasping member secured to said hook adjacent said bight, said shell grasping member comprising,
    1. a base portion extending on a plane substantially parallel to the shank of said fish hook,
    2. an arcuate portion projecting substantially normal to said base portion, and
    3. a shell grasping portion extending from said arcuate portion projecting substantially parallel to and spaced from said base portion,
  f. a horn ring member secured to said elongated shank, said horn ring including,
  g. a horn ring aperture adapted to receive the horn of a shrimp, and
  h. a horn ring securing means for securing said horn ring at a selected position relative to said shank.

2. The invention of claim 1 wherein said horn ring securing means comprises:
  a. a horn ring spring positioned closely adjacent said shank of said fish hook, and
  b. a spring aperture in said horn ring adapted to receive said spring and frictionally or latchably contact said spring aperture thereby retaining said horn ring in a selected position relative to said shank of said fish hook.

3. The invention of claim 1 wherein said horn ring and means for securing said horn ring comprises:
  a. a coil spring encircling said fish hook shank intermediate said bight and said line securing means, and
  b. a coil spring horn ring constructed integrally with said coil spring.

4. The invention of claim 1 wherein said horn ring securing means comprises a horn ring base encircling and frictionally engaging the shank of said fish hook.

5. The invention of claim 1 wherein said shell grasping member base portion comprises:
  a. an elongated spring projecting from the first end of said shank to a position adjacent said bight end of said shank, and
  b. said arcuate portion and said shell grasping portion being positioned closely adjacent and spaced from the bight of said fish hook.

6. The invention of claim 5 including a horn ring base encircling and frictionally engaging said shank of said fish hook and said elongated shell grasping member.

7. The invention of claim 1 wherein said shell grasping member comprises a spring wire constructed in a hooked looped configuration.

8. The invention of claim 7 including a horn ring base encircling and frictionally engaging said shank of said fish hook and said spring wire shell grasping member.

9. A live shrimp securing fishing lure comprising:
  a. a fish hook including,
  b. an elongated shank having,
  c. a line securing means at the first end of said shank,
  d. a bight end at the second end of said shank,
  e. a shell grasping member secured to said hook adjacent said bight, said shell grasping member comprising,
    1 a base portion extending on a plane substantially parallel to the shank of said fish hook,
    2 an arcuate portion projecting substantially normal to said base portion, and
    3 a shell grasping portion extending from said arcuate portion projecting substantially parallel to and spaced from said base portion, and
  f. a horn ring means for securing said hook to the horn of a shrimp.

* * * * *